US006766830B2

(12) United States Patent
Rondreux et al.

(10) Patent No.: US 6,766,830 B2
(45) Date of Patent: Jul. 27, 2004

(54) ISOLATING MODULE FOR A PNEUMATIC DISTRIBUTION MODULAR BLOCK

(75) Inventors: Serge Rondreux, Guichainville (FR); Grégory Lucas, Evreux (FR); Patrick Magnin, Le Plessis Hebert (FR)

(73) Assignee: Parker Hannifin Rak SA, Annemasse (FR)

( * ) Notice: Subject to any disclaimer, the term of this patent is extended or adjusted under 35 U.S.C. 154(b) by 127 days.

(21) Appl. No.: 10/237,880

(22) Filed: Sep. 10, 2002

(65) Prior Publication Data

US 2003/0062091 A1 Apr. 3, 2003

(30) Foreign Application Priority Data

Sep. 28, 2001 (FR) .......................................... 01 12514

(51) Int. Cl.[7] .............................................. F16K 11/10
(52) U.S. Cl. ...................................... 137/884; 137/269
(58) Field of Search ................................ 137/884, 269

(56) References Cited

U.S. PATENT DOCUMENTS

| | | | | | |
|---|---|---|---|---|---|
| 3,513,876 | A | * | 5/1970 | Tarbox | 137/884 |
| 3,747,623 | A | * | 7/1973 | Greenwood et al. | 137/269 |
| 3,756,274 | A | | 9/1973 | Wolfgramm | |
| 3,866,625 | A | * | 2/1975 | Kemner et al. | 137/269 |
| 4,712,578 | A | * | 12/1987 | White | 137/271 |
| 5,320,497 | A | | 6/1994 | Nagai et al. | |
| 5,778,930 | A | * | 7/1998 | Friedrichsen et al. | 137/596.13 |
| 5,950,661 | A | * | 9/1999 | Kirchhoff-Stewens | 137/269 |
| 6,155,287 | A | * | 12/2000 | Matarai et al. | 137/382 |
| 6,325,104 | B1 | * | 12/2001 | Yamashita | 137/884 |

FOREIGN PATENT DOCUMENTS

| | | |
|---|---|---|
| EP | 1 134 429 | 9/2001 |
| FR | 1538964 | 9/1968 |
| GB | 1044466 | 9/1966 |

* cited by examiner

*Primary Examiner*—John Fox
(74) *Attorney, Agent, or Firm*—Young & Thompson

(57) ABSTRACT

An isolating insert for, in a block of modules for distributing a pneumatic fluid, forming two adjacent block sections, comprising:

a body with an external surface comprising two parallel faces for assembly by juxtaposition against each adjacent module with, between these faces, internal channels providing the continuity of the common channels of the block and with a bypass for at least one of these internal channels opening out at the external surface of the element outside the assembly faces, a flat plate removably located on one of the above mentioned assembly faces, forming the closure and/or connection means of at least the internal channels of the body with the common channels of the block, the plate inseparably carrying a part identifying its function projecting from the external surface of the body.

4 Claims, 1 Drawing Sheet

ISOLATING MODULE FOR A PNEUMATIC DISTRIBUTION MODULAR BLOCK

The present invention concerns the grouping of pneumatic modules in a block, such as for example distribution modules.

BACKGROUND OF THE INVENTION

It is known, in the field of the controlled supply of pneumatic actuators (jacks, motors etc) how to use controlled distributors, disposed between a common pressurised fluid supply pipe, one or two common pipes for connecting the exhaust and the actuators, these distributors being grouped together in blocks of juxtaposed modules, each module having common pipes passing through it, these modules being able to be either in a single block, or in two parts, namely a base through which the common conduits pass surmounted by a distributor associated with a control solenoid valve.

In each module or base there therefore exists at least one length of the common pipes which extends between flat opposite faces of the module or of the base by means of which it is associated with the adjacent bases or modules with, between them, sealing elements.

It is often useful to divide a block into at least two groups, the distribution modules in one group having different requirements from the distribution modules in the other group. For example, in one and the same block, one group of modules concerns actuators requiring a low or normal supply (and/or exhaust) flow rate whilst another group of modules concerns actuators which are to be supplied at a higher flow rate. In other cases, the modules are grouped together in the same block according to the pressure level required by the actuators. It may also be necessary to associate, within one and the same block, distribution modules for actuators which work under pressure and others which work under vacuum. Finally, for a block grouping together a large number of modules, it may be advantageous to provide more than one pressurised fluid supply point and more than one exit point for the exhaust fluids collected.

The known basic architecture of a block comprises one or two end modules and juxtaposed distribution modules. The end module (or modules) provides the connection of the block to a general pressurised fluid source and to one (or two) general exhaust collection pipes. If there is only one end module, a tail plate acts as a plug for the common supply and exhaust collection pipes whether for the power fluid circuits or the control fluid circuits. In such a block, the requirements of the actuators satisfied by the distribution modules are common to each of them. When a block has distribution modules which are to satisfy different requirements, sections of block are created in which each group of modules has common requirements and the sections are isolated from each other in a block. This isolation is however specific to each of the cases for example identified above.

This finding leads to having to interpose, between two adjacent sections of a block, a specific isolation module according to the nature of the two adjacent sections. For example, where the difference between the two sections lies in the level of the supply pressure, the isolation module will concern the common supply pipe but will not act on the common exhaust collection pipe or pipes. On the other hand, if one section works under pressure and another section works under vacuum, the isolation module will cut off all communication between the common pipes and the supply and exhaust collection pipes for the two block sections. The result is the need for a manufacturer to produce several isolation modules in order to offer to his customers the possibility of meeting all the requirements of the installation to be manufactured. The need of different isolation modules is in contradiction with such a distribution technology, whereby a maximum number of configurations is obtained with a minimum number of different components, resulting in rationalisation in manufacture and increased ease in use.

There also exists on the market an isolation module having a single body whose function is specified by adding to it in situ plugs or connecting canulas supplied in bulk with the body and labels displaying the specification achieved. This design has the drawback of being a source of errors on two levels: at the time of fitting of the plugs or canulas, which may easily be confused because of their similarity in shape, and during the fitting of the label, which may be confused with another because of the similarity of the signs which it bears. Thus it is not rare for the module to be correctly configured but wrongly displayed or wrongly configured but correctly displayed or wrongly configured and wrongly displayed, which complicates the subsequent error correction action.

Finally, a older modular technology will be cited, illustrated by the document GB 1 044 466, in which sealing plates are fitted between modules, which preserve or cut off communication between two channels according to the nature of the intermediate plate between two adjacent modules. The plates are not easy to recognise from each other, just like the function which they provide, which is also a source of errors.

OBJECT AND SUMMARY OF THE INVENTION

By virtue of the present invention, it is possible to at least partially mitigate these drawbacks.

To this end the object of the invention is therefore an isolation insert for, in a block of pneumatic fluid distribution modules, forming two adjacent block sections, comprising a body whose external surface has two parallel faces for assembly by juxtaposition with each adjacent module, this body comprising, between these faces, internal channels providing the continuity of the common channels of the block, and a bypass for at least one of these internal channels opening out at a portion of the external surface of the component which does not include the assembly faces, this element also comprising a flat plate removably located on one of the aforementioned assembly faces in order to form the means of closure or connection of the internal channels of the body with the common channels of the block, this plate inseparably carrying a part identifying its function projecting from the external surface of the body.

It will be understood that thus, whatever the specific function of this insert, the body thereof is unique, its specificity being conferred on it by the plate which is associated with it. In addition to the standardisation of the manufacture of these inserts in two parts, the invention makes available to the user, in a reduced volume, an insert having, at the choice of the user, all the functions which he will need at the time of making up the distribution module blocks, this choice being able to be made in a safe fashion.

Advantageously, the assembly face of the body of the insert receiving the attached plate is stepped, the height of the step being substantially equal to the thickness of this plate. Thus the plate is embedded by matching of shapes in the juxtaposition face of the insert without increasing its longitudinal dimension, taken in the direction of the length of the block, which is then no greater than a normal module.

Finally, advantageously, the part identifying the function of the insert is a tongue which extends perpendicular to the plane of the plate and which appears on the external surface of the body when this plate is attached against its assembly face. From a visual examination of the block, the insert fitted and the specificity of its function is then immediately recognised.

Other characteristics and advantages of the invention will appear from the description of one embodiment given below by way of non-limiting example.

BRIEF DESCRIPTION OF THE DRAWINGS

Reference will be made to the accompanying drawings, amongst which.

MORE DETAILED DESCRIPTION

Figure 1:
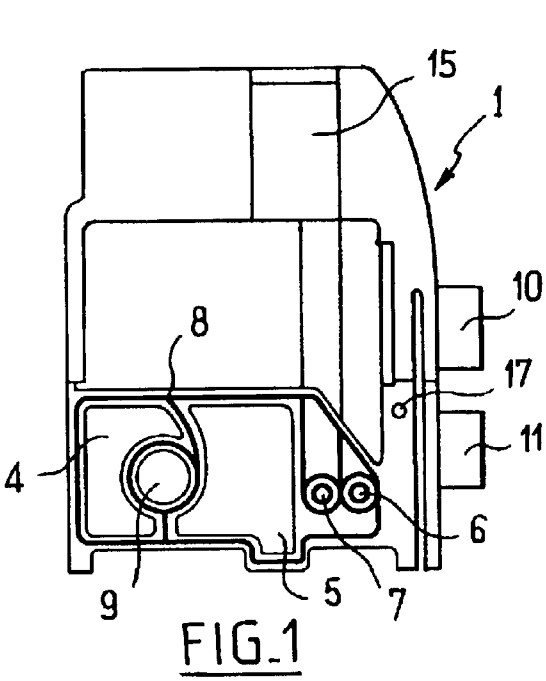
FIG. 1 is an external side view of an inserted module body on the side of its face accepting a plate according to the invention.
Figure 2:
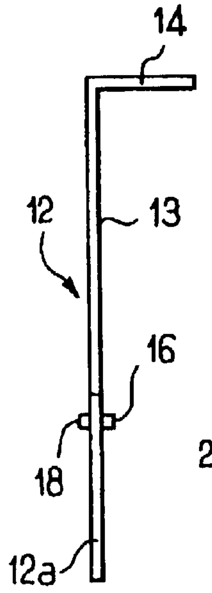
FIG. 2 is a view on the edge of a plate of the insert according to the invention.
Figure 3:
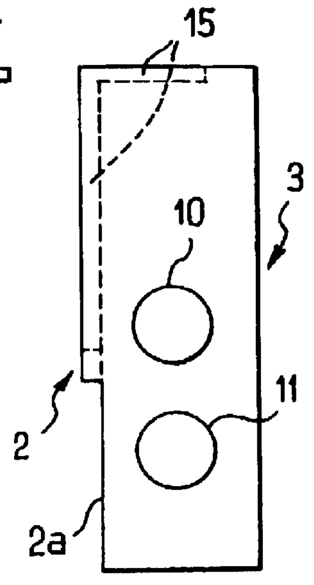
FIG. 3 is an external front view of the body of this insert.

The insert of the invention depicted in FIGS. 1 to 3 has a body 1 generally made from plastics material, whose external surface has two substantially parallel faces 2 and 3, the face 2 being visible in FIG. 1, and with a general profile identical to the profile of a pneumatic module, known per se, comprising conventionally a base surmounted by a distributor and the whole being surmounted by a solenoid valve controlling the distributor. At the basis of each distributor, the body 1 has two internal channels which open out on the faces 2 and 3, in particular a channel 4 through which a pressurised supply fluid runs, a channel 5 which participates in the collection of the exhausts from the distributors in the block, a channel 6 forming a length of common supply pipe to the control solenoid valves and a channel 7 forming a length of the control solenoid valve exhaust collection. These channels pass right through the thickness of the body 1 and are surrounded by a closed joint 8 attached to the face 2 of the body. The presence of an orifice 9 will also be noted, also passing right through, and which forms a passage housing for the tie rods or other elements for assembling the modules in a block.

The channels 4 and 5 are, in the present case, connected inside the body 1 to bypasses, not shown, opening out to the outside on the front surface of the body 1 through connecting pieces 10 and 11. The front face 2 of the body 1 is stepped in order to form a step whose bottom part 2*a* is that equipped with the joint 8.

The insert of the element also has a plate 12 whose bottom part 12*a* has a thickness identical to the height of the step of the stepped face 2 of the body 1 so as to come to be applied against the sealing joint 8. This plate 12 is extended in a single piece by the tongue 13 having a right-angled end part 14 which can come to be embedded in a recess 15 in the body 1. The top part 14 of the tongue is visible in the top part of the recess 15 provided on the face of the top of the body 1. The part 12*a* of the plate 12 has a locating finger 16 which cooperates with an orifice 17 of the body 1 when they are assembled. It also has another opposite finger 18 intended to be housed in an orifice similar to the one 17 in a module adjacent to the intermediate module in the block of modules.

Figure 4:
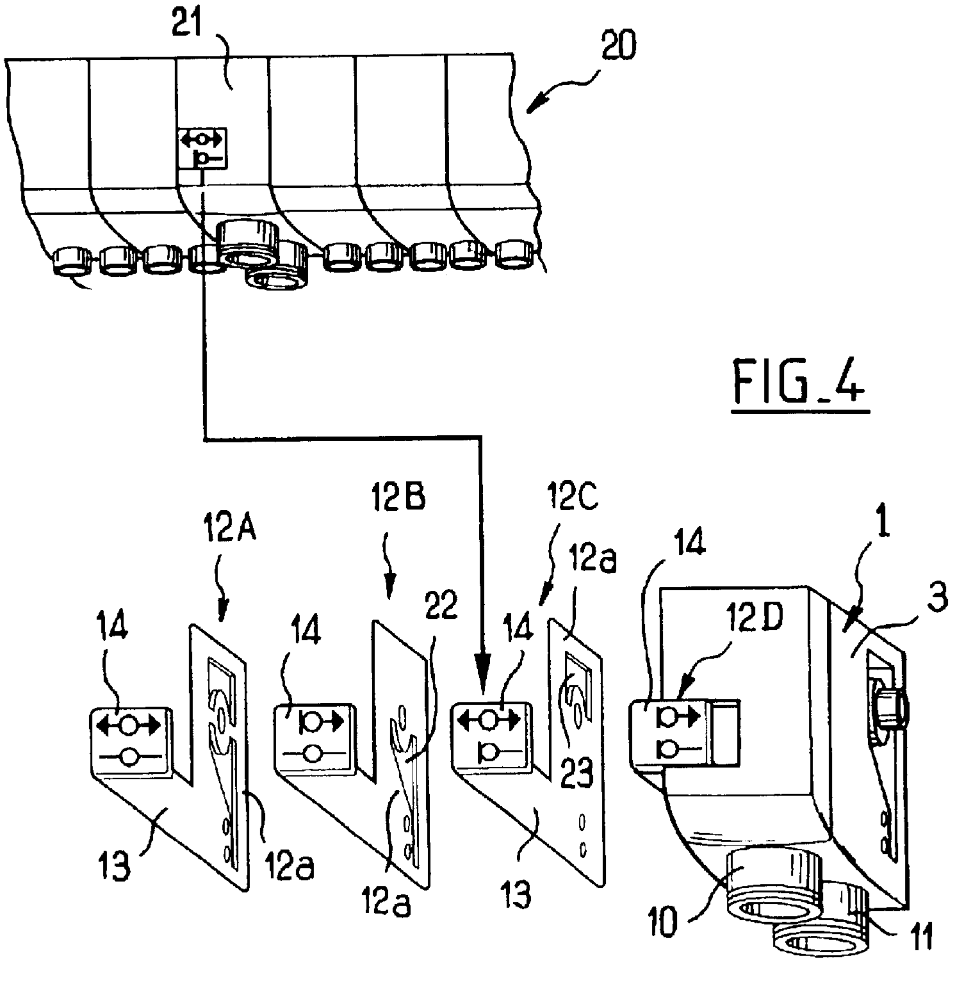
FIG. 4 depicts partially a block of distribution modules with an inserted module separating this block into two sections and the various plates which can be fitted to specify the function of the single-body inserted module.

FIG. 4 depicts partially a block 20 of pneumatic modules using an intermediate module 21 according to the invention. At the bottom part of this FIG. 4, the body 1 of the module 21 has been isolated (there are in this bottom part elements already described with the same references) and a set of interchangeable plates which can be associated with the body 1. Thus the plate 12A depicted on the left in FIG. 4 is a plate which leaves uncovered all the internal channels 4 and 5, as well as the channels 6 and 7, in the body 1 when it is associated with it. Under these conditions the insert formed from the body 1 and the plate 12A constitutes simply an external connection element of the block in which it is integrated in order to provide an auxiliary supply to it and an auxiliary collection point for the exhausts. The part 14 of the tongue 13 associated with this plate 12*a* carries a sign which displays this function of auxiliary supply and collection.

The plate 12B in FIG. 4 forms an obturator for the channel 4 whilst a hollowed-out part 16 preserves the connection of the channel 5 in the body 1 with the common exhaust pipe for the bases of the block. The tongue 14 of this plate 12B illustrates and displays by a sign the function of the insert thus formed, that is to say for example the supply of a section of blocks from a pressure source connected to the body 1 with a value different from that which supplies the inlet module of the block.

The plate 12C provides, in line with the body 1, the closure of the common exhaust pipe whilst preserving the integrity of the common supply pipe of the block in which the insert is placed.

Finally, it should be noted that the plate 12D which is partially associated with the body 1 in FIG. 4 carries a sign on its tongue 14 indicating that both the supply and exhaust common pipes are closed off. In other words, the bottom part 12*a* of this plate is completely solid with the exception where applicable of an orifice for the passage of the assembly means opposite the orifice 9 of the body 1 and two orifices opposite the pressure channels 6 and 7 for the controlled solenoid valve supply and exhaust collection.

It should be noted, although this is not shown in FIG. 4, that each of the plates 12 is equipped on its face opposite the one which cooperates with the body 1 with a joint like the one 8 depicted in FIG. 1.

This embodiment is an example applied to a block having a common pressure pipe and a common exhaust pipe. It will easily be understood that the invention also applies to blocks having a common pressure pipe and two common exhaust pipes, which are frequently encountered, as well as a more rare configuration including two common pressure pipes and one common exhaust pipe.

Finally, the fact should be mentioned that the invention encompasses any variant embodiment of the part identifying the function of the insert, which may assume for example the form of a flexible flag (see 14' in FIG. 2) made from the same material as the plate but thinner, whether or not this flag is kept folded over the external surface of the element by effective fixing means (glue, label grooves etc).

What is claimed is:

1. An isolation insert for, in a block of pneumatic fluid distribution modules, forming two adjacent block sections, comprising a body with an external surface having two parallel faces for assembly by juxtaposition against each adjacent module, with, between these faces, internal channels providing the continuity of the common channels of the block, and a bypass for at least one of these internal channels opening out at the external surface of the component outside the assembly faces, wherein said insert comprises a flat plate removably located on one of the aforementioned assembly faces, forming the means of closure and/or connection of the internal channels of the body with the common channels of the block, the plate inseparably carrying a part for supporting a sign of identification of its function projecting from the external surface of the body.

2. An isolating insert according to claim 1, wherein the assembly face of the body receiving the attached plate is stepped, the height of the step being substantially equal to the thickness of the plate.

3. An isolating insert according to claim 2, wherein the identification part of the plate is a tongue perpendicular to its plane and which extends over the external surface of the body when the plate is attached to this body.

4. An isolating insert according to claim 1, wherein the body and the plate both have one or more auxiliary channels passing through them, intended to route the supply to the control solenoid valves and/or their exhausts.

* * * * *